(12) United States Patent
Loff

(10) Patent No.: US 7,984,426 B2
(45) Date of Patent: Jul. 19, 2011

(54) GRAPHICAL REPRESENTATION OF DEPENDENCIES BETWEEN CHANGES OF SOURCE CODE

(75) Inventor: Claudia Renate Loff, Hockenheim (DE)

(73) Assignee: SAP AG, Walldorf (DE)

(*) Notice: Subject to any disclaimer, the term of this patent is extended or adjusted under 35 U.S.C. 154(b) by 1042 days.

(21) Appl. No.: 11/647,905

(22) Filed: Dec. 28, 2006

(65) Prior Publication Data

US 2008/0163187 A1 Jul. 3, 2008

(51) Int. Cl.
*G06F 9/45* (2006.01)
(52) U.S. Cl. ........................................ 717/121
(58) Field of Classification Search .................. 717/121
See application file for complete search history.

(56) References Cited

U.S. PATENT DOCUMENTS

| | | | | |
|---|---|---|---|---|
| 5,715,454 A * | 2/1998 | Smith | ........................... | 707/690 |
| 5,873,097 A * | 2/1999 | Harris et al. | ........................... | 1/1 |
| 6,385,768 B1 * | 5/2002 | Ziebell | ........................... | 717/121 |
| 7,716,649 B2 * | 5/2010 | Clemm et al. | ............... | 717/128 |
| 2004/0205726 A1 * | 10/2004 | Chedgey et al. | ............... | 717/125 |
| 2007/0106980 A1 * | 5/2007 | Felts | ............................. | 717/124 |
| 2007/0162903 A1 * | 7/2007 | Babb et al. | ..................... | 717/154 |

* cited by examiner

*Primary Examiner* — Philip Wang
(74) *Attorney, Agent, or Firm* — Blakely, Sokoloff, Taylor & Zafman

(57) ABSTRACT

Embodiments of the invention include a system for analyzing and displaying dependencies of change lists tracked by a software configuration management system. The process may include retrieving a set of change lists and traversing each change list to determine dependencies between change lists. The process may generate a graphical representation of a hierarchy of the set of change lists defined by the dependencies. The system may include a file storage system to store a plurality of change lists and a change list analysis module to traverse the plurality of change lists to determine dependencies between the change lists. A graphics module may display change lists and dependencies received from the change list analysis module.

24 Claims, 6 Drawing Sheets

GRAPHICAL REPRESENTATION OF DEPENDENCIES BETWEEN CHANGES OF SOURCE CODE

BACKGROUND

1. Field of the Invention

The invention relates to software configuration management. Specifically, the embodiments of the invention relate to the generation of a graphical representation of the dependencies between lists of changes to software components to facilitate the management of the development process for software.

2. Background

Software configuration management (SCM) systems and software are used during software development to facilitate the management of a product. Development of software often involves the creation of numerous software components or modules in the form of source or compiled code. These separate components may be developed by different individuals, groups or teams. Each software component may have dependencies on or interact with other software components. Further, each of the software components may change incrementally over the development process.

The SCM system provides a centralized mechanism for organizing the changes and dependencies between the changes to the various software components. The SCM system manages a repository of software components that compose a software project or program. Developers submit sets of updates to the software components to the SCM system which stores and logs the changes to the software components as change lists. The SCM system manages access or updating to software components to prevent software components from being accessed or changed by different developers at the same time or to ensure the coherency of the software components to be modified. Some SCM systems allow parallel changes and provide a merge tool to merge the parallel changes, resolve conflicts between changes and ensure the coherency of the changes to the software components.

The presentation of the data and dependencies related to change lists is tracked by the SCM and presented as a flat table or record format. The change list and associated software component data includes the ownership, version, dependencies and similar information. The SCM is used to find software components that are not completed or ready for the next stage of development. However, the process is slow because the data for each change list affecting a software component must be carefully reviewed to determine inconsistencies such as dependency loops between change lists and blocking change lists. The complex interdependencies in large software projects can cause this process to take days of review to analyze, because the review of the data is manual and the flat presentation is difficult to interpret.

SUMMARY

Embodiments of the invention include a system and process that facilitates software configuration management. The process may include retrieving a set of change lists and traversing each change list to determine dependencies between change lists. The process may generate a graphical representation of a hierarchy of the set of change lists defined by the dependencies. The system may include a file storage system to store a plurality of change lists and a change list analysis module to traverse the plurality of change lists to determine dependencies between the change lists. A graphics module may display change lists and dependencies received from the change list analysis module.

BRIEF DESCRIPTION OF THE DRAWINGS

Embodiments of the invention are illustrated by way of example and not by way of limitation in the figures of the accompanying drawings in which like references indicate similar elements. It should be noted that different references to "an" or "one" embodiment in this disclosure are not necessarily to the same embodiment, and such references mean at least one.

DETAILED DESCRIPTION

Figure 1:
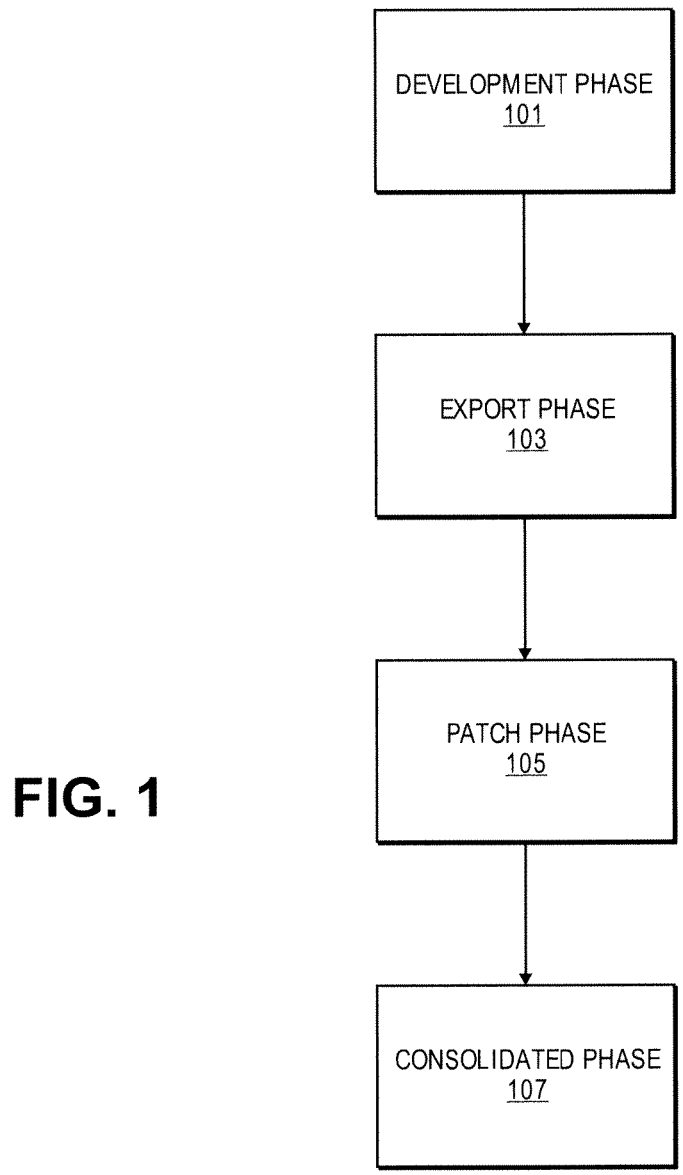
FIG. 1 is a flow chart of one embodiment of a software production process.

FIG. 1 is a flow chart of one embodiment of a software production process. The development process may be divided into a set of phases. A set as used herein may indicate any number of items including one. A first phase of the development process may be a development phase (block 101). The development phase may be a time period during which developers prepare an initial version of the software product including the design and coding of each of the software components that form the software product.

The development phase may also include continuous changes to the software components that are posted to the software configuration management system (SCM) as change lists. A change list may refer to code or a log of changes to a software component. The SCM may log the receipt and integration of change lists. The change lists may have any format or configuration.

Testing on local machines, such as developer's machines and other available test hardware, may also be undertaken during the development phase. Individual software components, groups of software components or the entirety of the program may be assembled into a build (i.e., a machine executable format of the program) for testing and debugging purposes. Any number or frequency of builds may be assembled or tested. Once a build has been sufficiently tested, the developers may release the build or individual software module components may be marked as ready for release or consolidation. Release or consolidation may refer to the transport (e.g., copying of data) of source data from a first location to a second location for purposes of co-location of interdependent software modules and files. The transport process may be a movement of data from one physical location to another or a modification of the sources to include references to the physical or logical location of each software module involved in the transport. This process may be implemented through the release or consolidation of change lists associated with the software components that make up a build. Each change list required to implement the build from the last build may be released or consolidated.

In one embodiment, a release or consolidation of the change lists and associated software components may occur in an export phase (block 103). Each of the change lists and associated software components must be ready for release. An analysis of the dependencies and bundles of change lists must find that each has a status indicating their readiness for the consolidation. A bundle of change lists may be any grouping of change lists identified manually or automatically. All of the changes to the software components are collected and synchronized. The software components modified according to the change lists may be collected and copied to a new location such as a new entry or record in the same database, another server or database manager, a portable media device such as a memory stick, compact disc, a file system, distributed files system, Internet based file system or similar machine readable machine medium. The copy or transport of the software components may be done at regular intervals such as a weekly or monthly cycle. Each exported change list and associated program product may be time stamped to log its creation.

In the next phase, a patch phase, the consolidated change lists and associated collected software modules may be integrated to form a complete product (block 105). A smaller team of developers may work on the integrated software components to create patches and debug the integrated code. Additional testing may be conducted to ensure the quality of the software product. During this phase quality control managers and testers may analyze the software components and designate components that meet predefined standards as ready for the next phase of development. The software components in the patch phase that are designated as ready for the next phase may be copied or transported into the next phase by storage or copying to a new location such as a new entry or record in the same database, another server or database manager, a portable media device such as a memory stick, compact disc or similar machine readable medium.

In the final phase, consolidation phase (block 107), the software modules may be prepared for distribution by compilation onto a computer readable medium or for distribution through an online service or similar channel of communication. The consolidated phase may integrate the change lists and associated software components with one another or with other software components or applications. The integrated software components are fully operational and ready for use and to be utilized.

Figure 2:
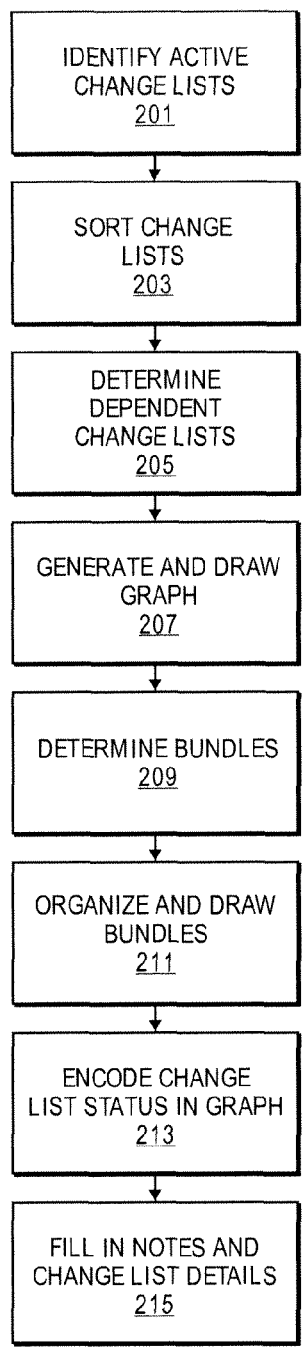
FIG. 2 is a flow chart of one embodiment of a change list graphing and display process.

FIG. 2 is a flow chart of one embodiment of a change list graphing and display process. In one embodiment, the process may be initiated by a user such as a developer, project manager, administrator or similar user. The user may utilize a user interface of the SCM to initiate the process. In other embodiments, the process may be initiated by another application, plug-in or similar program in communication with the SCM.

In one embodiment, the change list graphing and display process may begin by identifying all active change lists associated with a particular project designated by a user (block 201). An SCM may manage multiple projects and the user may select any subset of the projects or any set of software components and change lists associated with a project or set of projects to be analyzed by the graphing and display process.

The process may access each of the change lists associated with the selected project or software components to determine active change lists. Active change lists may be those change lists that have a specific identifier indicating that the change list is still valid or applicable to modify the associated software component or set of components. For example, multiple change lists may have been submitted for a particular set of software modules. Some of the change lists may be superseded by the subsequent change lists and marked as inactive. A change list may be marked as inactive if a developer desires to roll back a set of changes from the change list, if a change list creates a data inconsistency or for similar reasons.

All of the identified active change lists may then be sorted (block 203). The change lists may be sorted to facilitate the subsequent processing of the change lists. For example, the change lists may be sorted according to an identifier, the file names associated with the change list, chronological order of submission or similar criteria. The sorting allows the change lists to be further analyzed and graphed in a particular predetermined or user selected order. The order may be selected to present an intuitive display of the change lists and their interrelationships.

The ordered change lists may be traversed to determine the dependencies between the change lists (block 205). Dependencies between change lists may be explicit or implicit. Explicit dependencies may be listed or stored within the change list indicating the change lists by an identifier that each change list is dependent upon. Each change list may be dependent on any number of other change lists. Dependencies between change lists may also be implicit. The implicit dependencies may not be stored or listed in the change list; the process may derive the dependencies based on other data stored in the change list. The derivation process may check the files or software modules that are affected by the change list, the owner of the change list, a status of a change list, the number or order of the change list, the time stamp of a change list or similar data related to each change list.

Each of the change lists may be traversed in the order generated by the previous phase. In another embodiment, the change lists may be traversed based on other criteria including the sorted order, the dependencies, related software components or modules and similar factors. For example, the change lists may be traversed primarily according to the sorted order, but all of the dependencies of a change list may be traversed before the next ordered change list is traversed.

In one embodiment, the change list dependency data may be provided to a graph drawing module to generate a graph of the change lists including their dependencies and hierarchy (block 207). The graphing module may be a separate module dedicated to generating graphs or may be integrated with the SCM application. In one embodiment, a general purpose graphing module or function, such as that available from the JNet graphics package by SAP AG of Walldorf, Germany may be utilized. In another embodiment, a specialized drawing or graphics package may be utilized. The dependency data may be converted into graph points and symbols based on the functionality of the graphing module. In some embodiments, the graphing module may plot the connecting lines showing dependencies between change lists. In other embodiments, the process may plot the position of change list symbols and connecting dependency lines and provide this data to a drawing program.

The process may determine if the change lists are associated with bundles (block 209). A bundle is a designation of an interrelationship between change lists. The bundle may indicate that the change lists belong to a particular build, version, set of software components, programs or indicate a similar relationship between change lists. The bundling of change lists may be explicitly recorded in a change list or may be derived from data in the change lists. A change list may store an alphanumeric indicator indicating a bundle or set of bundles that the change list belong to.

In another embodiment, the bundle identifier may be determined by analysis of the files modified by the change list, the owner of the change list, change list dependencies or similar criteria. The bundle definitions may be predetermined or selected by a user of the SCM interface at the time that the graphing and display process is initiated or may be adjusted during the use of the graphing and display process.

In further embodiments, the bundle designation for change lists may be determined before the determination or graphing of dependencies. One of ordinary skill would understand that the order of the process may be altered such that the bundling may be determined and drawn prior to or in parallel with the determination and graphing of dependencies.

Figure 3:
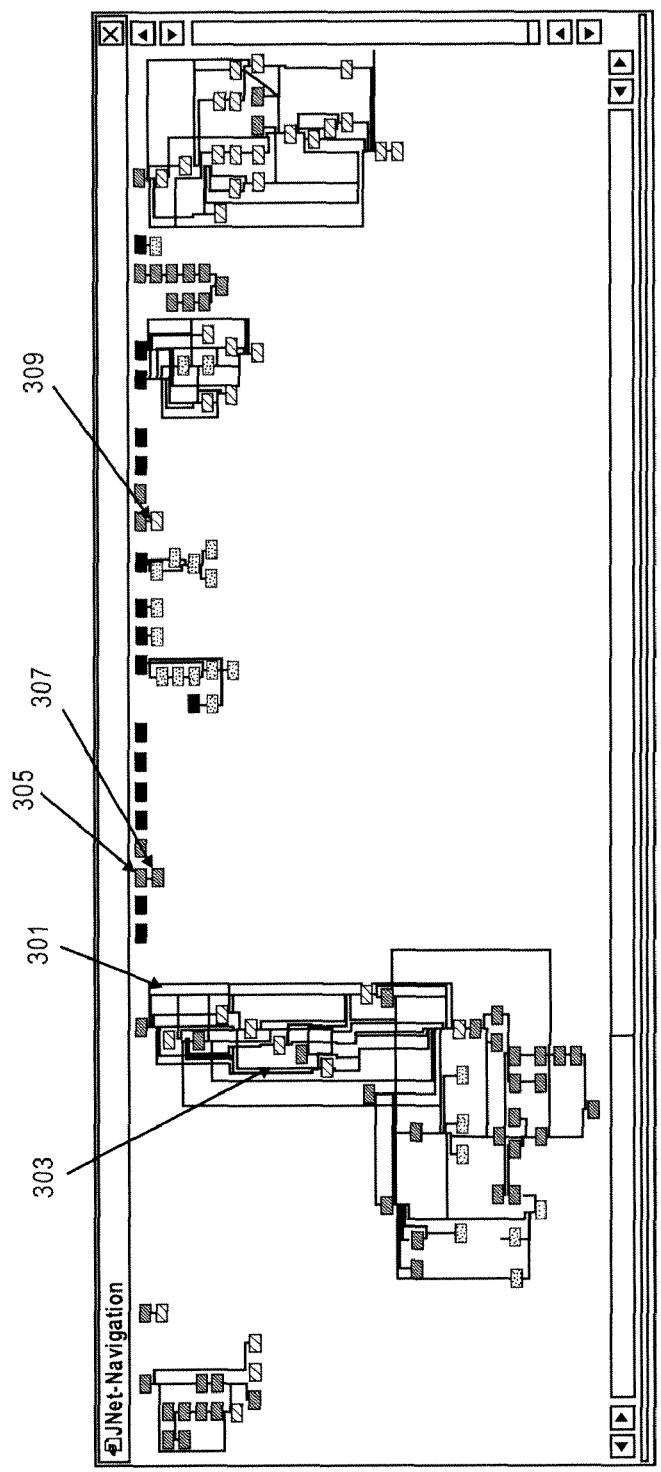
FIG. 3 is a diagram of one embodiment of a display of change lists for a development project.

FIG. 3 is a diagram of one embodiment of a display of change lists for a development project. In one example embodiment, the change lists may be displayed in a single window or set of windows. For example, all change lists may be shown in a single window generated by JNet or a separate window may be generated for each interdependent set of change lists.

In one embodiment, change lists may be graphed and displayed in a top down, side to side, perspective or similar display viewpoint. The relative position of change lists may be used to indicate a characteristic of the change lists such as a unique identifier, a date of entry into the system or similar characteristic of the change list. Multiple characteristics may affect positioning. For example, the relative order of dependency between change lists may be tied to an x-axis, while an approximate time of entry or creation of a change list may be tied to a y-axis. In other embodiments, any number of characteristics may be tied to the position of each change list in a display.

Individual change lists may be represented in the graph as any symbol including geometric shapes like rectangles, irregular shapes, simple or complex icons and similar symbols. The shape of the symbol may be used to represent any characteristic of the change list. Similarly, the color, pattern, internal symbols and similar traits of the symbol may represent characteristics of a change list.

For example, a set of colors for the symbols may be defined to represent a state of each change list. A green color may be used to represent change lists that do not depend from other open change lists. These green change lists 305 may be consolidated immediately. A yellow color may be used to represent change lists that depend from another open change list in a particular status. For example, the change list from which the yellow change lists depends may need to be in a new or green state. A new state may indicate that the change list is not dependent on other change lists or is a separate branch 301 of a set of change lists. A yellow colored change list 307 may not be consolidated without consolidation of the green change list from which the yellow change list depends.

A red change list (not shown) may be used to indicate a change list with a detected error related to the change list. Errors that may be indicated by marking the change list red include consolidation of the change list where the predecessor or parent change list is not consolidated or is consolidated in a bundle with open changes. Other errors may indicate internal inconsistencies in the change list, erroneous commands or code in the change list inconsistent bundlings, multiple bundlings and similar errors.

A grey colored change list 309 may be used to indicate change lists that depend from green change lists 305 or yellow change lists 307 that have not been consolidated. The grey colored change lists 309 may be ready for consolidation or other processing. Grey may be used to color these change lists to deemphasize these change lists because they are not blocking the further processing of the other change lists.

Lines or links between change lists may also be used to indicated information about the characteristics of the relationship between two change lists. The size, shape, color and similar traits of the lines may be used to represent information about these interrelationships. For example, a colored link, such as a red link, may be used to indicate an erroneous relationship between two change lists. An error indicated by a red link between change lists may include the unique identifier of a parent or predecessor change list being greater than the child or succeeding change list, a detected loop or cycle path or similar error information regarding the relationship.

A bold or fatter link may be used to indicate or emphasize a relationship between a selected, highlighted or similarly chosen change list and a parent or child of that change list. This facilitates the identification of related change lists for analysis and review. Similar techniques may be used to provide information to a user regarding the relationships between the change lists or about the change lists themselves.

In one embodiment, a bundle may be displayed as colored area or similarly marked area enclosing the relevant change lists or a similar symbol or technique may be utilized. For example, a bundle 303 may encompass a subset of the change lists assigned to a particular branch 301. Each of the change lists to be assigned to the bundle may be drawn into an already drawn bundle area or the bundle areas may be drawn to encompass already drawn change lists.

Figure 4:
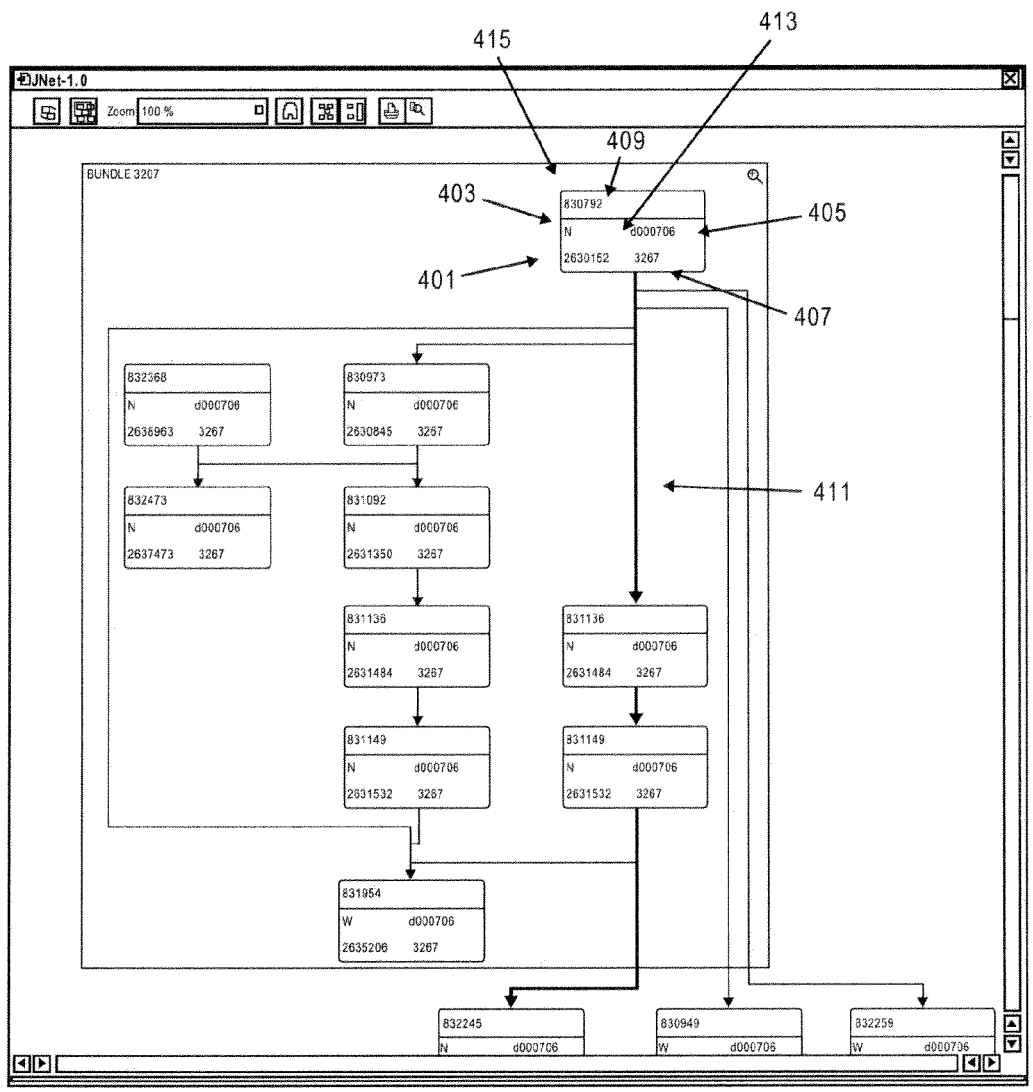
FIG. 4 is a diagram of one embodiment of a set of change lists organized as a bundle.

FIG. 4 is a diagram of one embodiment of a set of change lists organized as a bundle. The diagram shows an example of a selected set of interrelated change lists and the details of the data displayed regarding the change list.

An example change list 415 is shaped like a rectangle with colored section. A top colored section may be a title section including the change list number 409. In other embodiments, this specialized section may be excluded or otherwise altered. The color of the section may be used to indicate the selection of the change list or a related change list. For example, the color of the change list in this section may change from grey to blue when selected.

A second colored section 405 may contain a second set of information related to the change list. The color of the second section 405 may indicate a development status of the change list, as discussed above. Any information related to the change list may be displayed in any section of the symbol representing the change list. This display of information including its organization and selection may be determined by a user or may be predetermined. For example, the second section may include data regarding the transport or copy status 403, global unique identifier 401, bundle number 407, owner 405 or similar information. Data in this section may be color coded to provide further information. For example, data may be colored red when an error is associated with the data.

The example illustrated in this figure also shows the use of a bold or thickened and colored line 411 for displaying a dependency between change lists. The line 411 in this example is colored blue and a section and border of each of the related change lists are similarly colored to indicate the shared relationships between the change lists.

Figure 5:
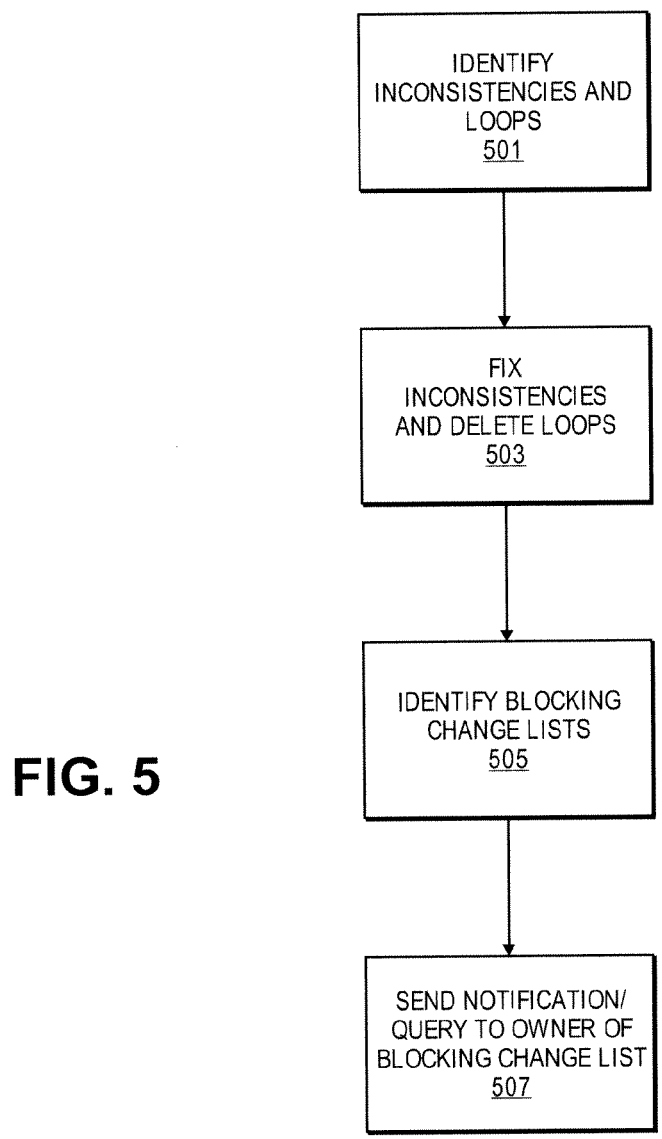
FIG. 5 is a flow chart of one embodiment of a change list analysis process.

FIG. 5 is a flow chart of one embodiment of a change list analysis process. In one embodiment, the process may be initiated by reception of a request to check a set of change lists. Any combination of change lists may be selected for processing. The process may initiate by analyzing the dependency data for the selected set of change lists (block 501). This data may be graphed to be visually checked or may analyzed by an automated process without user intervention or any combination of these techniques.

The dependencies may be analyzed for inconsistencies and loops (block 503). Identified loops may be corrected by deleting at least one segment to eliminate the loop. Any scheme or algorithm may be used to select a segment of a loop to delete. The correction of inconsistencies may also include the removal of out of sequence change lists, broken or redundant links and similar errors that may be detected by analysis of the graphed changed lists or their dependency data.

In one embodiment, a user or an automated process may identify blocking change lists (block 505). A blocking change list is a change list that is not ready for consolidation, transport or other processing in the development process that blocks dependent change lists from likewise being processed. Identifying the blocking change lists allows for a notification to be made to the owner of the change list to prepare the change list or associated software files for the designated processing (block 507). Being able to easily identify the blocking change list improves the ease with which the development process may be managed by identifying the blocking change list and focusing effort on preparing the change list and associated software modules or files.

Figure 6:
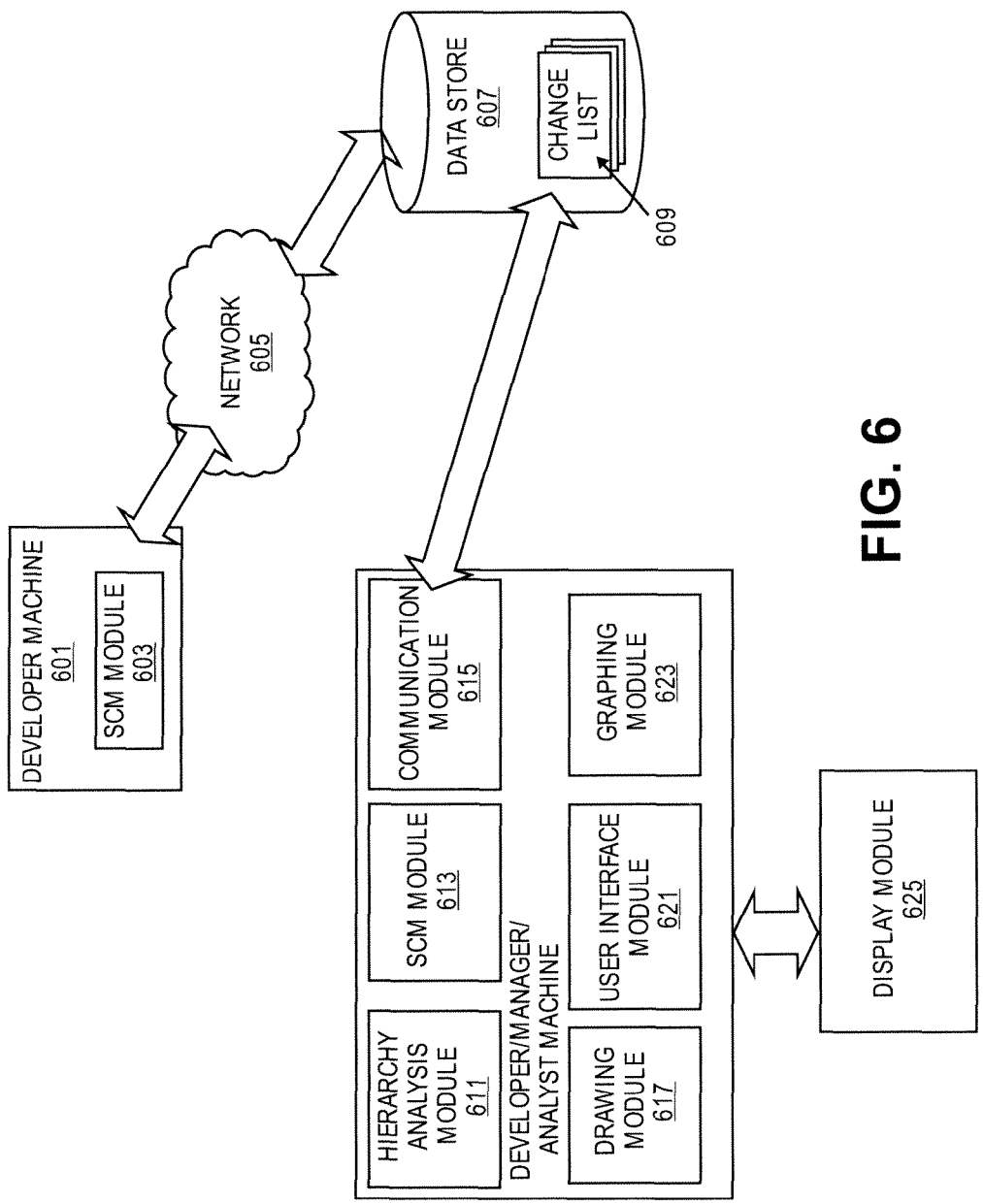
FIG. 6 is a diagram of one embodiment of a software configuration management system with change list analysis and display modules.

FIG. 6 is a diagram of one embodiment of a software configuration management system with change list analysis and display modules. In one embodiment, the system may include any number of machines 601 connected over a network 605 to a storage device 607 that serves as a storage location for change lists 609 related to the development of a program or application.

The machines 601 may be utilized by developers and other users to modify and generate code for software components relevant to the program or application. The machines 601 may utilize a software configuration manager (SCM) 603 to facilitate the management of the development of the program or application. The SCM 603 manages the storage of change lists related to the update and generation of software components for the product. The SCM may have a client portion 603 that runs on each of the developer machines 601 and a server portion 613 that manages the data storage device 609 to copy and protect change list data 609 therein.

The SCM server module 613 or other components of the SCM system may execute on a developers machine, a dedicated server, a managers computer, an analyst's machine or similar machine. The components that may execute on this machine to facilitate the management of data within the SCM system may include a communication module 615, hierarchy analysis module 611, drawing module 617, graphing module 623, user interface module 621 or similar modules.

An analyst, developer, manager or similar entity may seek access to accumulated SCM data to analyze the data selected by the user. A communication module 615 may allow the other components to communicate by sending and receiving data to other developer machines, the data store and other applications.

The hierarchy analysis module 611 may analyze dependencies between the change lists being received and may detect loops and similar inconsistencies in the received change list data. The hierarchy analysis module 611 may automatically correct the found inconsistencies or notify a user of the inconsistencies. The hierarchy analysis module 611 may also help organize the dependency and change list data to be displayed as a graph through the display module 625. The data may be prepared to be sent directly to a drawing module 617 or may be prepared for graphing by the graphing module 623.

A drawing module 617 may generate visual representations of input data from the graphing module 623 or the hierarchy analysis module 611. The drawing module 617 may generate visual representations based on detailed instructions or may generate visual representation based on basic graphing data.

The graphing module 623 may provide at least a portion of the data to the drawing module 617. The graphing module 623 may receive dependency data from the hierarchy analysis module 611 and generate a graph based on the received data. The resulting graph is rendered for display by the drawing module 617 and user interface module 621 through the display module 625.

The user interface module 621 generates windows and other SCM related data to allow a user to utilize the SCM system including the functions of the hierarchy analysis module 611 and similar system components. The user interface module 621 may generate windows, tool bars, menus, multimedia playback and similar functions.

The display module 625 may be any visual display system such as a television, LCD or plasma monitor, CRT, projector or similar display system. The display module 625 may be directly coupled to the manager machine or similar machine to interact with the functions of the hierarchy analysis module and similar components of the SCM system.

In one embodiment, the components of the SCM system including the graphing and analysis modules may be on a server or distributed across several machines. The components may be executed on a set of dedicated servers or may be executed on a workstation or similar machines. One of ordinary skill would understand that the example illustrated system may be modified or organized in many different configurations.

The software configuration management system including the graphing and analysis modules may be implemented as hardware devices. In another embodiment, these components may be implemented in software (e.g., microcode, assembly language or higher level languages). These software implementations may be stored on a machine-readable medium. A "machine readable" medium may include any medium that can store or transfer information. Examples of a machine readable medium include a ROM, a floppy diskette, a CD-ROM, a DVD, flash memory, hard drive, an optical disk or similar medium.

In the foregoing specification, the invention has been described with reference to specific embodiments thereof. It will, however, be evident that various modifications and changes can be made thereto without departing from the broader spirit and scope of the invention as set forth in the appended claims. The specification and drawings are, accordingly, to be regarded in an illustrative rather than a restrictive sense.

What is claimed is:

1. A method comprising:
retrieving a set of change lists;
traversing each change list from the set of change lists to determine dependencies between change lists;
determining blocking change lists from the set of change lists; and
generating, by a computer system, a graphical representation of a hierarchy of the set of change lists defined by the dependencies, the graphical representation visually identifying the determined blocking change lists as blocking.

2. The method of claim 1, further comprising:
sorting the set of change lists by a change list number or unique identifier to facilitate further processing of the set of change lists.

3. The method of claim 1, further comprising:
searching for active change lists in the set of change lists to enable visual identification in the graphical representation.

4. The method of claim 1, further comprising:
identifying a successor change list for a first change list in the set of change lists to enable visual identification in the graphical representation.

5. The method of claim 1, further comprising:
drawing a symbol for a change list.

6. The method of claim 5, wherein the symbol is color or shape coded to indicate status of the change list.

7. The method of claim 1, further comprising:
determining a bundle identifier for a change list; and
grouping change lists using the bundle identifier into a graphical representation of a bundle.

8. The method of claim 1, further comprising:
displaying information related to a change list in a graphical representation including one of an owner, bundle identifier and a change list identifier.

9. The method of claim 1, further comprising:
identifying loops in dependencies of the set of change lists; and
deleting at least one segment of each loop in the dependencies of the set of change lists.

10. The method of claim 1, further comprising:
receiving a user input indicating a graphical representation of a change list; and
changing a graphical representation of an interrelationship of a change list corresponding to the graphical representation of the change list.

11. A system comprising:
a file storage system to store a plurality of change lists;
a change list analysis module to traverse the plurality of change lists to determine dependencies between the change lists and to determine blocking change lists; and
a graphics module to display the determined blocking change lists as blocking and to display change lists and dependencies received from the change list analysis module.

12. The system of claim 11, wherein the change list analysis module determines a shape or color to indicate a status of each of the plurality of change lists.

13. The system of claim 11, further comprising:
a tracking module to receive a user input indicating a change list and to direct the graphics module to alter a display of dependencies related to the change list.

14. The system of claim 11, further comprising:
a loop identification module to identify cycles in dependencies amongst the plurality of change lists.

15. A machine readable medium having a set of instructions stored therein which when executed cause a machine to perform a set of operations comprising:
accessing a first change list to determine a dependency on a second change list;
determining whether the first change list is blocking the second change list; and
forwarding blocking data and dependency data to a charting module to generate a graphical representation of a hierarchy of the first change list and the second change list, the graphical representation of the first change list indicating that the first change list is blocking the second change list.

16. The machine readable medium of claim 15, having a further set of instructions stored therein which when executed cause a machine to perform a set of operations further comprising:
ordering the first change list and second change list by a change list number or unique identifier to facilitate further processing of the first change list and second change list.

17. The machine readable medium of claim 15, having a further set of instructions stored therein which when executed cause a machine to perform a set of operations further comprising:
determining whether the first change list is active to enable visual identification in the graphical representation.

18. The machine readable medium of claim 15, having a further set of instructions stored therein which when executed cause a machine to perform a set of operations further comprising:
displaying a graphical representation of a change list.

19. The machine readable medium of claim 18, wherein the graphical representation includes a color or shape to indicate status of the change list.

20. The machine readable medium of claim 15, having a further set of instructions stored therein which when executed cause a machine to perform a set of operations further comprising:
retrieving a bundle identifier from the first change list and second change list; and
displaying the first change list and second change list as part of a graphical representation of a bundle based on the bundle identifier.

21. The machine readable medium of claim 15, having a further set of instructions stored therein which when executed cause a machine to perform a set of operations further comprising:
displaying information related to the first change list in a graphical representation including one of an owner, bundle identifier and a change list identifier.

22. The machine readable medium of claim 15, having a further set of instructions stored therein which when executed cause a machine to perform a set of operations further comprising:
identifying loops in dependencies between the first change list and the second change list
deleting at least one segment of each loop in the dependencies between the first change list and the second change list.

23. The machine readable medium of claim 15, having a further set of instructions stored therein which when executed cause a machine to perform a set of operations further comprising:
determining if the second change list is blocking the first change list.

24. The machine readable medium of claim 15, having a further set of instructions stored therein which when executed cause a machine to perform a set of operations further comprising:
receiving a user input indicating a the first change list; and
changing a graphical representation of the interrelationships the first change list and second change list in response to the user input.

* * * * *